United States Patent [19]

Luttrell et al.

[11] 4,104,499

[45] Aug. 1, 1978

[54] ELECTRIC ARC WELDING GUN

[75] Inventors: Edward Luttrell, Clinton, Tenn.; Paul W. Turner, Idaho Falls, Id.

[73] Assignee: The United States of America as represented by the United States Department of Energy, Washington, D.C.

[21] Appl. No.: 737,757

[22] Filed: Nov. 2, 1976

[51] Int. Cl.² .............................................. B23K 9/02
[52] U.S. Cl. ................................. 219/60 A; 219/60.2; 219/125.11
[58] Field of Search ................ 219/60 A, 123, 125 R, 219/125.11, 60.2

[56] References Cited

U.S. PATENT DOCUMENTS

| 2,868,953 | 1/1959 | Gardner, Jr. | 219/125 R |
|---|---|---|---|
| 3,784,782 | 1/1974 | Lochen | 219/125 R |
| 4,017,709 | 4/1977 | Watanabe et al. | 219/123 X |

FOREIGN PATENT DOCUMENTS

| 232,858 | 2/1961 | Australia | 219/125 R |
|---|---|---|---|
| 1,408,426 | 10/1975 | United Kingdom | 219/125 R |

Primary Examiner—E. A. Goldberg
Attorney, Agent, or Firm—Dean E. Carlson; Stephen D. Hamel; Fred O. Lewis

[57] ABSTRACT

This invention relates to improved apparatus for arc welding an interior joint formed by intersecting tubular members. As an example, the invention is well suited for applications where many similar small-diameter vertical lines are to be welded to a long horizontal header. The improved apparatus includes an arc welding gun having a specially designed welding head which is not only very compact but also produces welds that are essentially free from rolled-over solidified metal. The welding head consists of the upper end of the barrel and a reversely extending electrode holder, or tip, which defines an acute angle with the barrel. As used in the above-mentioned example, the gun is positioned to extend upwardly through the vertical member and the joint to be welded, with its welding head disposed within the horizontal header. Depending on the design of the welding head, the barrel then is either rotated or revolved about the axis of the vertical member to cause the electrode to track the joint.

5 Claims, 5 Drawing Figures

ELECTRIC ARC WELDING GUN

BACKGROUND OF THE INVENTION

This invention was made during the course of, or under, a contract with the Energy Research and Development Administration.

This invention relates generally to electric-arc welding and more particularly to improvements in apparatus for conducting the same. The invention is designed particularly for welding the interior joint formed when a tubular member is teed into another tubular member. In accordance with the invention, such welds are made with a specially designed welding gun which is positioned to extend through one of the members and into the interior of the other. As will be described, the head of the gun is designed so that magnetic fields generated by the welding current interact with each other to deflect the welding arc in such a way that the welded joint is essentially free from objectionable "rolled-over" solidified metal.

As used herein, the term "arc welding" includes the use of electric arcs to join parts, add metal to surfaces, and spotweld. The term "gas shielded-arc welding" refers to producing coalescence under the shield of a protective gas by the heat of an electric arc maintained between an end of a consumable or non-consumable metal electrode and the part to be welded. The shielding gas may or may not be inert, pressure may or may not be used, and filler metal may or may not be used. The term "gas tungsten-arc welding" is used herein to refer to the form of the process in which the electrode is tungsten. As used below in connection with welds extending about the end of a tubular member, the phrase "rolled-over metal" refers to solidified metal which extends into or overlaps the interior of the member. "Metallic" as used below includes metals and metal alloys. The word "teed" is used to refer to interconnecting tubular members which are generally perpendicular to each other.

As is well known (e.g., see Chapter 23, *Welding Handbook Sixth Edition, American Welding Society*), a welding arc has its own associated magnetic field which may interact with external magnetic fields, either permanent or induced, with the undesirable result that the welding arc continually shifts or wavers. Various patents are directed toward confining and stabilizing the welding arc by the application of externally generated magnetic fields—as, for example, U.S. Pat. Nos. 1,851,479; 1,854,536; and 2,475,183. Other patents, such as U.S. Pat. Nos. 2,475,183 and 2,702,846, are directed toward employing a permanent magnets of electromagnets to deflect a welding arc in a selected direction. U.S. Pat. No. 2,743,342 describes varying the current through an electromagnet to cause a welding arc to gyrate about the axis of the welding electrode.

SUMMARY OF THE INVENTION

It is an object of this invention to provide novel apparatus for arc welding an interior joint formed by intersecting tubular members.

It is another object to provide an arc welding gun of novel design.

It is another object to provide apparatus for welding an interior joint formed by the intersection of two tubular members, the resulting welded joint being substantially free from rolled-over metal.

Other objects will be made evident hereinafter.

This invention may be summarized as follows: Apparatus for interiorly welding the joint formed by a first tubular member teed into a second tubular member comprising: an arc welding gun including an elongated and electrically conductive barrel positioned to extend longitudinally within the first member and into the interior of the second member, the portion of said barrel extending into the second member being provided with an electrically conductive and reversely extending tubular tip which extends adjacent to said portion, said gun also including a welding electrode which is supported by and extends from said tip, the axes of said tip and electrode defining an acute angle with the axis of said portion of said barrel; electrically non-conductive gun-support means extending coaxially within said first member and rotatable about the axis of the first member, said means being affixed to a section of said barrel; drive means coupled to said support means for rotating the same; and an electrical power supply connected between said barrel and said joint.

BRIEF DESCRIPTION OF THE DRAWINGS

The drawings are not to scale. In the various drawings, generally similar components are designated by the same numbers.

DESCRIPTION OF THE PREFERRED EMBODIMENT

This invention was developed as a solution to a problem encountered in welding certain aluminum-alloy branch lines into the bottom of a relatively long aluminum-alloy header by means of the gas tungsten-arc process. Design specifications called for the branch lines and the header to have inside diameters of one inch and four inches, respectively. Because of the small diameters involved and the close spacing stipulated for the branch lines, a decision was made to join the lines to the header by interior welds.

An experimental welding arrangement was developed to produce the desired welds. This arrangement included a rotatable welding gun assembly, the welding gun having a specially designed head. The welding arrangement was tested by welding branch lines to flat plates and to cylindrical headers. High-quality welds were produced. An unexpected benefit was obtained in that the resulting welds were substantially free from rolled-over metal. As a result, the welds in the as-fabricated state did not constitute an obstruction to flow through the lines and thus did not require dressing or shaping.

Figure 1:
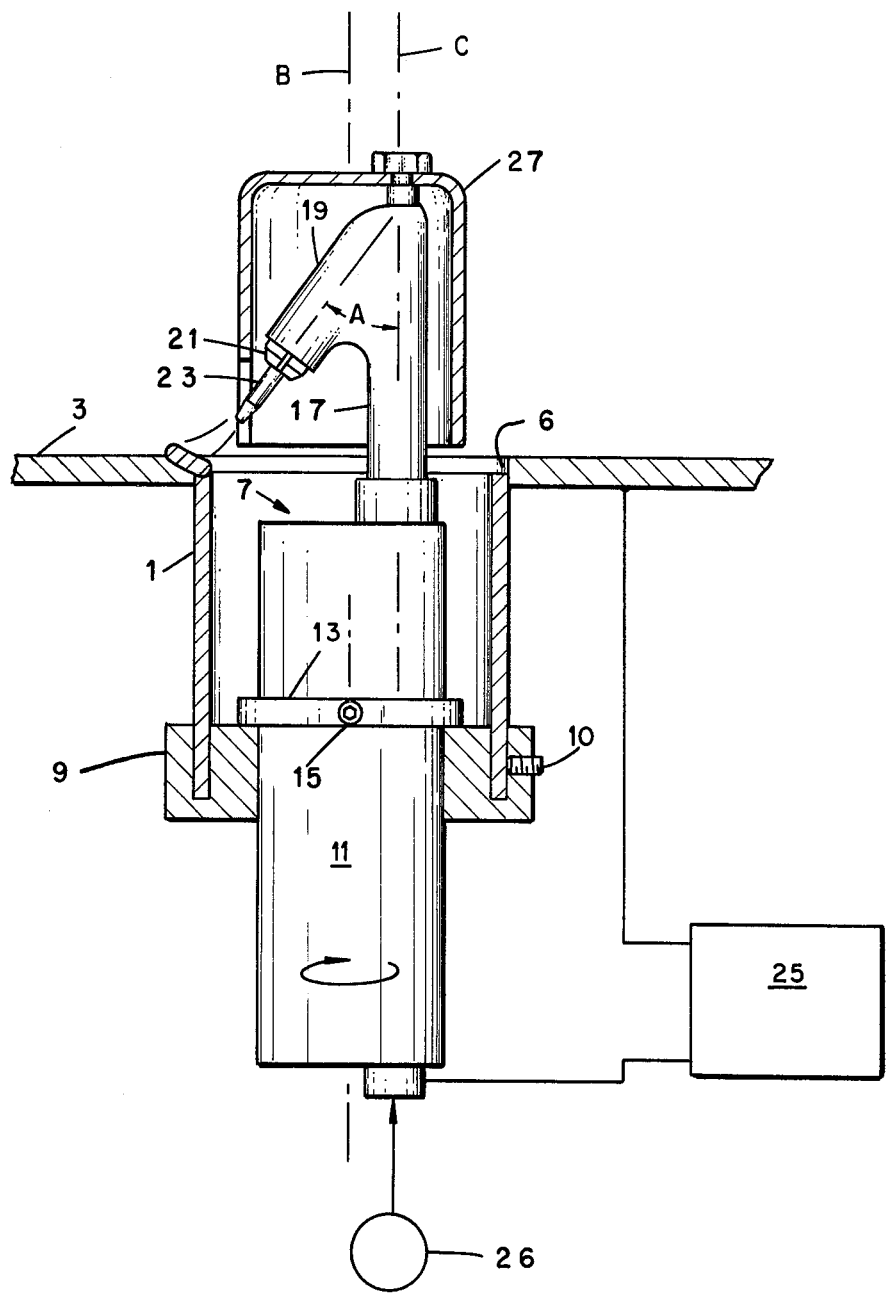
FIG. 1 is a side view, partly in section, of a branch line teed into a flat plate, such as a wall of a header of rectangular cross section. An experimental gas tungsten-arc welding gun designed in accordance with this invention is shown as positioned for welding the branch line to the upper face of the plate.

FIG. 1 illustrates the principle of the experimental arrangement referred to above, the rotatable gun assembly being designated by the numeral 7. As shown, the gun assembly 7 is positioned to extend longitudinally through the branch line 1 and into the interior of the header 3. The gun assembly is supported by a ring 9 formed with a groove for reception of the lower end of the branch line, the ring being clamped to the line by a set-screw 10. Extending through the ring 9 is a generally cylindrical and electrically non-conductive insert 11, which is rotatable about the axis B of the line 1. A collar 13 is clamped to the insert by a setscrew 15 and rests on the ring 9.

A main portion 17 of the metallic barrel for the welding gun extends through the insert 11 along an axis C and is affixed to the insert. As shown, the upper end of the main barrel portion terminates in a generally rearwardly, or reversely, extending tubular tip 19. Mounted in the end of the tip is a metallic split collet 21 for holding a standard tungsten electrode 23. The axis of the electrode and the axis of the main barrel portion 17 define an angle A of less than 90°. As shown, a standard a.c. welding power supply 25 is connected to the header 3 and the barrel of the gun. Also, a source 26 of pressurized shielding gas (e.g., argon) is connected to deliver gas to the interior of the barrel portion 17. This gas leaves the barrel through the grooves in the collet 21, shielding the electrode 23 and the portion of the joint adjacent to the electrode. The upper end of the welding gun carries a cap 27 for retaining shielding gas. As shown, the skirt of the cap encloses the welding head and is formed with an aperture through which the electrode 23 extends.

Referring to FIG. 1, the portion of the gun assembly which extends within the header is referred to herein as the "welding head"(parts 23, 21, 19, and the upper portion of 17). Because of the small diameter of the joint, a highly compact head is required; to meet this requirement, the gun assembly is designed with the main barrel portion 17 offset laterally from the axis of rotation B of the insert 11. As a result, rotation of the insert revolves the barrel about axis B so that the electrode tracks the joint. Where space permits, however, the gun assembly may be designed with the axis of its barrel coinciding with the axis B of the insert.

In a typical operation, the gun assembly 7 is positioned in the branch line 1 as shown, the ring 9 being clamped to the line to support and center the assembly. The spacing between the electrode 23 and the joint 6 may be adjusted by loosening the setscrew 15 and vertically positioning the gun assembly relative to the collar 13. Any suitable means (not shown) may be provided to rotate the gun assembly about axis B.

An experimental gun assembly generally similar to that shown in FIG. 1 was tested by welding joints, each consisting of a branch line teed into the bottom of a plate. The lines and the plates were composed of Type 3003 aluminum alloy. The branch lines had an inside diameter of one inch and a wall thickness of 0.065 inch. The plates had a thickness of $\approx$0.125 inch. The welding gun was designed with an angle A of 30°. With the welding gun positioned in the branch line as shown in FIG. 1, the top of the cap 27 extended 0.250 inch beyond the upper face of the plate. The electrode-to-joint spacings used to form the various welds were in the range of 0.0626 to 0.094 inch. The shielding gas used in these tests was argon (flow rate, 12 CFH), and the welding current was 150 amps a.c. The welding voltage was in the range of 14–17 volts. The gun assembly was rotated at the rate of one revolution each thirty seconds.

For purposes of comparison, similar joints were welded with a conventional gas tungsten-arc welding gun of the "pencil" type. The conventional welds were made with the "pencil" positioned above the plate and defining an angle of about 30° with a surface thereof.

Figure 3:
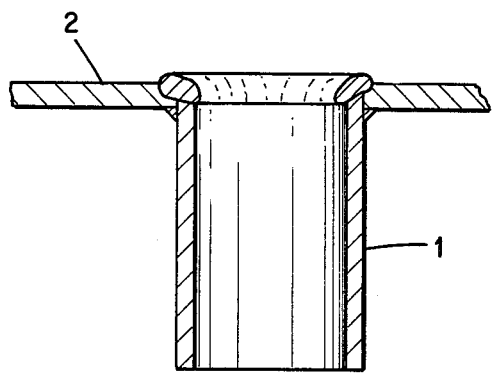
FIG. 3 is a corresponding view of a similar joint as welded with a gas tungsten-arc welding gun designed in accordance with this invention.
Figure 2:
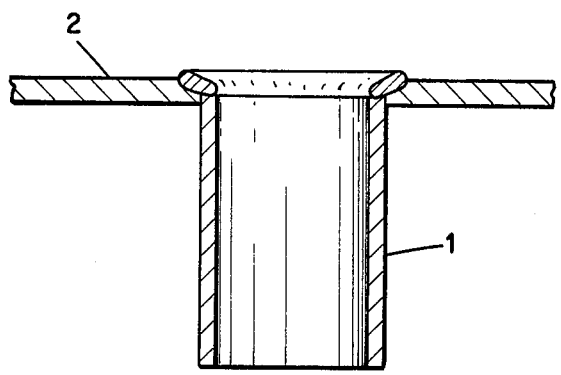
FIG. 2 is a longitudinal section of part of a tee joint as welded with conventional pencil-type gas tungsten-arc welding gun.

FIGS. 2 and 3 illustrate welds typical of those obtained with the experimental gun (weld shown in FIG. 2) and with the conventional gun (weld shown in FIG. 3). As indicated in FIG. 2, welds which were essentially free from rolled-over metal were obtained consistently with the new gun, not only when the lines were welded to plates but also when they were welded into the bottom of cylindrical aluminum-alloy headers (diameter, four inches). As indicated in FIG. 3, the welds produced with the conventional gun exhibited considerable roll-over, as well as creep of weld metal to the underside of the joint.

The mechanism by which the new gun produces improved welds of the kind illustrated in FIG. 2 is not completely understood. In order to interiorly weld intersecting, small-diameter tubular members, we have designed a compact welding head in which the electrode (23, FIG. 1) extends rearwardly, defining an acute angle with the laterally adjacent barrel portion 17. Thus, the welding current flows in different directions through the barrel portion 17 and the electrode, and the self-generated magnetic fields about the arc and the barrel portion 17 are of opposite sense. Presumably, these fields reinforce each other in the region between the arc and the adjacent main portion of the barrel, with the result that the tip of the arc is deflected laterally outward of the axis of the electrode, into a region of lower flux density. FIG. 1 illustrates such deflection of the arc. Presumably, the deflection of the arc results in the molten metal being confined to a region somewhat outward from the inner edge of the branch line 1, and thus the welded joint is substantially free of rolled-over metal. The amount of arc deflection varies inversely with the size of the acute angle A (FIG. 1). Preferably, this angle is less than about 60°.

Figure 4:
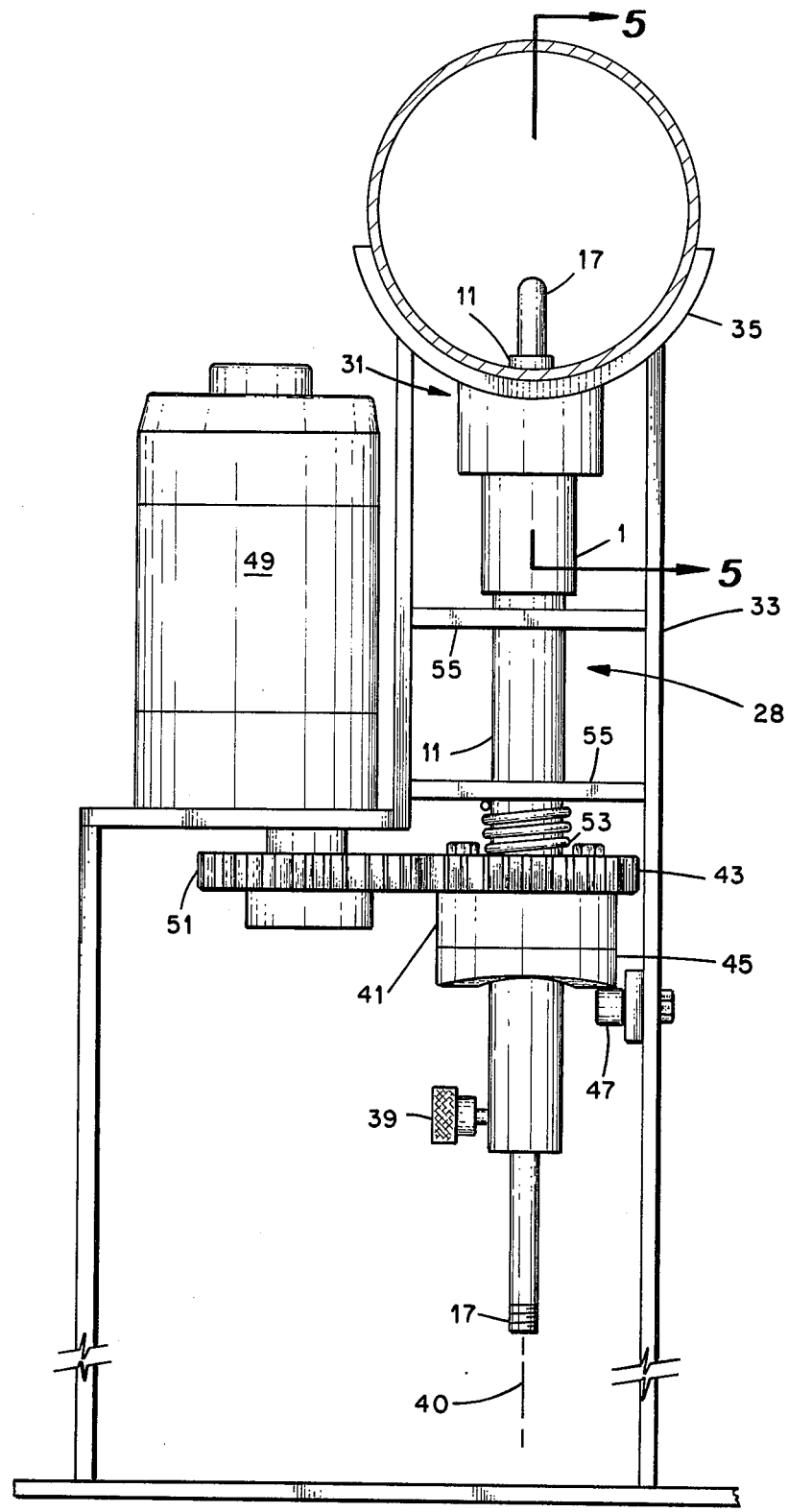
FIG. 4 is a side elevation of another embodiment of the invention.
Figure 5:
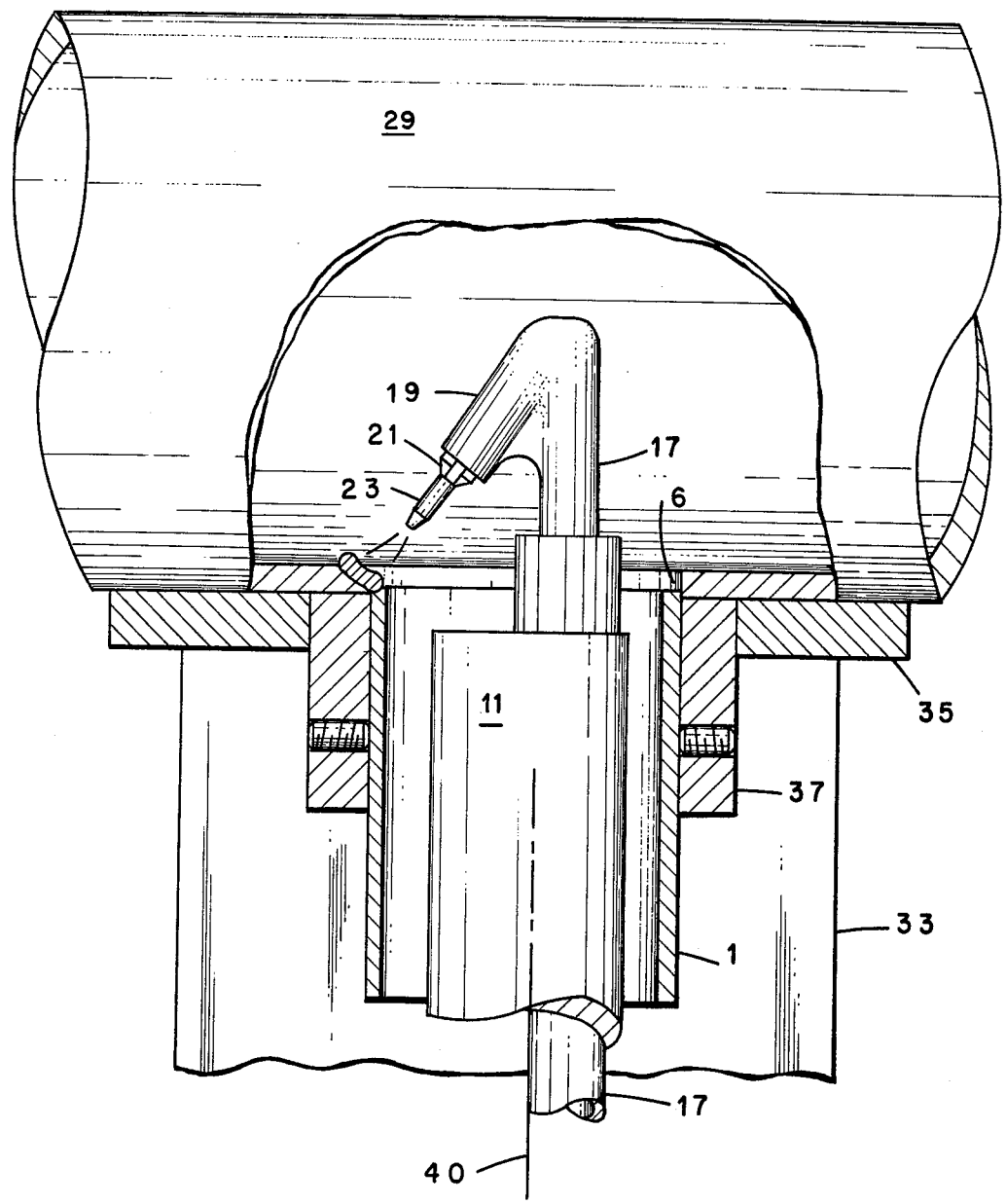
FIG. 5 is a sectional view taken along line 5—5 of FIG. 4.

FIGS. 4 and 5 illustrate another embodiment of gas tungsten-arc welding apparatus designed in accordance with this invention. The apparatus is shown as positioned to join a one-inch-diameter branch line 1 to a four-inch-diameter cylindrical manifold 29 by means of a weld at joint 6 (FIG. 5). The members to be joined are held in welding position by a fixture 31 supported by a frame 33, both of which are composed of aluminum alloy. The fixture comprises an arcuate manifold-support 35, into the bottom of which is teed a sleeve 37 for clampingly supporting the branch line 1. As shown, the rotatable gun assembly 28 includes a tubular, current-conducting barrel including a main portion 17 and a rearwardly extending tip portion 19 containing a metallic collet 21 for holding a standard tungsten electrode 23. The axis of the electrode defines an angle of 45° with the axis of the main barrel portion 17. The barrel portion 17 extends through generally cylindrical phenolic insert 11, along an axis which is displaced from the axis of the insert (see FIG.5). The barrel is clamped to the insert by a non-conductive screw 39. The insert 11 is formed with a collar 41. As shown in FIG. 4, the upper tip of the insert extends upwardly of the joint 6 to prevent arc-back between the main portion 17 of the barrel and the members to be welded.

Still referring to FIGS. 4 and 5, the insert 11 is coaxially mounted in the branch line 1 for rotation about the axis 40 of the line. The medial portion of the insert extends through apertures in partitions 55 (FIG. 4) in the frame. A gear 43 for rotating the insert 11 about axis 40 is secured to the top of the collar as shown. An annular cam 45 is secured to the bottom of the collar and rides on a roller 47 supported by the frame 33. As shown, the frame supports a drive motor 49 having a drive gear 51 which is meshed with the gear 43. Thus, rotation of the motor rotates the cam-and-gun assembly about axis 40, causing the electrode 25 (FIG. 5) to track the joint 6. The lower face of the cam is contoured to raise and lower the cam-and-gun assembly during rotation so as to provide the best electrode-to-joint spacing as the electrode tracks the joint. A helical spring 53 is mounted in compression between the frame 33 and the upper face of gear 43 to urge the cam against the roller 47. Any suitable source of shielding gas (not shown) is connected to the lower end of the barrel 17, and a suitable welding power supply (not shown) is connected between the barrel and manifold 29.

The invention has been illustrated above in terms of the gas tungsten-arc welding of aluminum-alloy members, using an a.c. power supply. Various other applications will be evident to one versed in the art. For instance, the members to be joined may be selected from a wide variety of current-conductive metallic materials, such as steel, Monel, and titanium. Depending on the application, the welding current may be a.c., d.c., or pulsating d.c. So far as is known, consumable electrodes are not sufficiently flexible to permit their being fed through an angled welding head of the kind described herein, but in the event that sufficiently flexible consumable electrodes are available, they may be used where appropriate. When the gun is designed for gas shielded-arc welding, any suitable gas or gas mixture may be used; depending on the particular application, the gas may either be inactive, (e.g., helium) or active (e.g., carbon dioxide or nitrogen). If desired, the barrel 17 and tip 19 may be connected through a flexible coupling permitting adjustment of the angle A. Also, the tip 19 may be made of telescoping sections to permit adjustment of its length. In some applications one or both of the members to be welded may be of non-circular cross section. For instance, the branch line may be of obround configuration, in which case the special welding head would be provided with any suitable drive means for moving it through an obround path so as to track the joint.

What is claimed is:

1. Apparatus for interiorly welding the joint formed by a first tubular member teed into a second tubular member comprising:

an arc welding gun including an elongated and electrically conductive barrel positioned to extend longitudinally through the first member, in laterally offset relation to the axis thereof, and into the interior of the second member, the portion of said barrel extending into the second member being provided with an electrically conductive and reversely extending tubular tip which extends adjacent to said portion, said gun also including a welding electrode which is supported by and extends from said tip, the axes of said tip and electrode defining an acute angle with the axis of said portion of said barrel;

electrically non-conductive gun-support means extending coaxially within said first member and rotatable about the axis of the first member, said means being clamped to a section of said barrel;

drive means coupled to said support means for rotating the same; and an electrical power supply connected between said barrel and said joint.

2. The apparatus of claim 1 wherein said acute angle is less than 60°.

3. Apparatus for interiorly welding the joint formed by a first tubular member teed into a second tubular member comprising:

an arc welding gun including an elongated and electrically conductive barrel of annular cross-section positioned to extend longitudinally within and in laterally offset relation to the axis of the first member and into the interior of the second member, the portion of said barrel extending into the second member being provided with an electrically conductive and reversely extending tubular tip which extends adjacent, to said portion, said gun also including a welding electrode which is supported by and extends from said tip, the axes of said tip and electrode defining an acute angle with the axis of said portion of said barrel;

electrically non-conductive gun-support means extending coaxially within said first member and being rotatable about and translatable along the axis of the first member, said means being clamped to a section of said barrel, whereby rotation of said means revolves said tip about said axis and whereby translation of said means alters the axial spacing between said tip and joint;

means for rotating said gun-support means;

means for effecting translation of said gun-support means when the latter is being rotated; and an electrical power supply connected between said barrel and said joint.

4. The apparatus of claim 3 wherein said acute angle is less than 60°.

5. The apparatus of claim 3 wherein movement of said gun-support means along said axis is effected by a cam.

* * * * *